INVENTOR.
ANDREW EISELE.
BY Barthel & Bugbee
ATTORNEYS

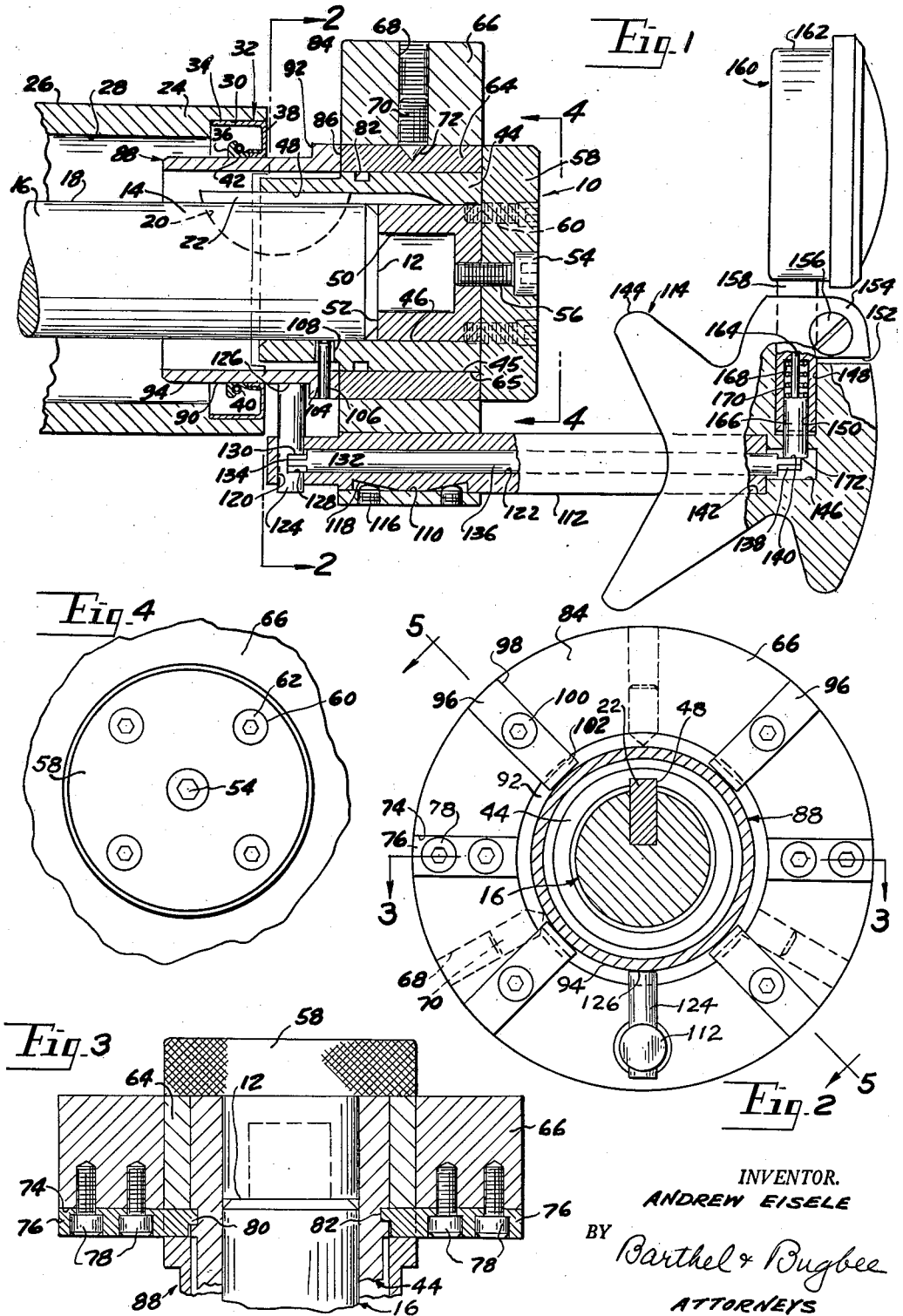

United States Patent Office 3,106,781
Patented Oct. 15, 1963

3,106,781
SHAFT-AND-BORE CONCENTRICITY GAUGE
Andrew Eisele, 459 Beldon Road, Garden City, Mich.
Filed Apr. 6, 1961, Ser. No. 101,199
12 Claims. (Cl. 33—174)

This invention relates to concentricity gauges and, in particular, to gauges for measuring the concentricity between a shaft and a bore in a structure around the shaft.

One object of this invention is to provide a shaft-and-bore concentricity gauge which will precisely and rapidly indicate any departure from concentricity of a shaft and a bore adjacent thereto and intended to be concentric with the shaft.

Another object is to provide a shaft-and-bore concentricity gauge of the foregoing character where the bore and shaft area of so nearly the same diameters that the annular space between them is not radially wide enough for the insertion of the feeler of a measuring pin of a concentricity gauge.

Another object is to provide a shaft-and-bore concentricity gauge, as set forth in the object immediately preceding wherein a tubular measurement transfer member is inserted snugly in the space between the shaft and the bore to be measured, and wherein the concentricity gauge measures the concentricity of the tubular member relatively to the shaft, or any departure therefrom.

Another object is to provide a shaft-and-bore concentricity gauge, as set forth in the two objects immediately preceding, wherein the tubular measurement transfer member is floatably and self-aligningly mounted upon the concentricity gauge so that it instantly adjusts itself into concentricity with the bore to be measured while it is being inserted therein and is movable radially relatively to the concentricity gauge.

Another object is to provide a shaft-and-bore concentricity gauge, as set forth in the three objects immediately preceding, wherein means is provided for retaining the tubular measurement transfer member in assembly with the concentricity gauge while permitting relative radial sliding therebetween for self-alignment of the tubular member within the bore to be measured.

Another object is to provide a modified shaft-and-bore concentricity gauge wherein the annular space between the shaft and the bore to be measured is of sufficient width for the insertion of the feeler or measuring pin of the concentricity gauge, and wherein the concentricity gauge is of a special construction permitting such insertion to be made with rapidity and facility.

Other objects and advantages of the invention will become apparent during the course of the following description of the accompanying drawings, wherein:

FIGURE 1 is a central longitudinal vertical section, partly in side elevation, of a shaft-and-bore concentricity gauge, according to one form of the invention, showing the tubular measurement transfer member thereof inserted in a bore within a shaft oil seal member, the concentricity of which is to be measured relatively to the shaft;

FIGURE 2 is a cross-section taken along the line 2—2 of FIGURE 1;

FIGURE 3 is a horizontal longitudinal section taken along the line 3—3 of FIGURE 2;

FIGURE 4 is a fragmentary end elevation looking in the direction of the arrows 4—4 in FIGURE 1;

Figure 5:
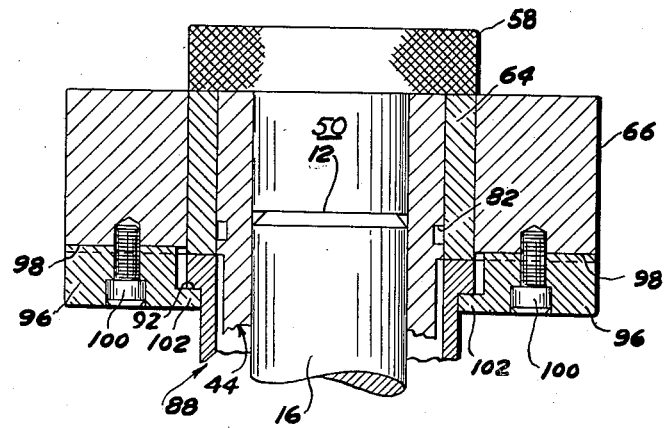
FIGURE 5 is an oblique longitudinal section taken along the inclined line 5—5 of FIGURE 2.

Referring to the drawings in detail, FIGURES 1 to 5 inclusive show a shaft-and-bore concentricity gauge, generally designated 10, according to one form of the invention as fitted against the end 12 of the exposed end portion 14 of a shaft 16 having an external cylindrical surface 18. The end portion 14 is provided with an arcuate recess or key seat 20 adapted to receive a conventional Woodruff key 22. The shaft 16 is disposed within the hollow cylindrical axially-projecting portion 24 of a housing 26, such as an engine crankcase, which has an internal cylindrical surface 28 containing a counterbore 30 of enlarged diameter forming the seat for a conventional oil seal, generally designated 32.

The oil seal 32 in turn includes an annular collar 34 of angle cross-section and ordinarily made of metal with a resilient annular internal member 36 of synthetic rubber or similar material secured to an axially-projecting internal flange 38 and constricted by a spring 40. The member 36 has an internal cylindrical surface 42, the centricity of which relatively to the axis of the shaft 16 it is the function of the concentricity gauge 10 to measure. The shaft-and-bore concentricity gauge 10 (FIGURE 1) includes a locating sleeve 44 containing a locating bore 46 which in turn is provided with an axial groove or keyway 48 adapted to receive the projecting portion of the key 22 so as to prevent relative rotation between the locating sleeve 44 and shaft 18 and to cause the two to rotate in unison when turned by hand during the making of measurements, as explained below in connection with the operation of the invention. The sleeve 44 has a machined outer cylindrical surface 45.

Mounted in the outer end of the bore 46 within the locating sleeve 44 is a cup-shaped stop member 50 having an annular radial end stop surface 52 adapted to engage the end surface 12 of the shaft 16 and drilled and threaded centrally to receive a set screw 54 of the so-called Allen type which passes through a countersunk hole 56 in a knurled handle disc or hand wheel 58. The latter is also drilled and threaded as at 60 at circumferentially-spaced intervals to receive Allen screws 62 by which it is secured to the correspondingly-drilled and threaded locating sleeve 44. The rim of the handle disc 58 projects radially beyond the periphery of the locating sleeve 44 to serve as a stop for retaining one end of an adapter bushing 64 with an internal cylindrical bore 65 accurately fitting the cylindrical surface 45. The bushing 64 in turn is engaged by an encircling knurled handle ring 66 which is radially drilled at 68 to receive three headless pointed set screws 70 seated in the correspondingly-shaped recesses 72 of the adapter bushing 64.

The handle ring 66 on its inner side which faces the housing portion 24 is provided with a pair of deep diametrically-aligned radial grooves 74 which receive radial inner dogs 76 (FIGURES 2 and 3) which in turn are drilled to receive Allen screws 78 threaded into the handle ring 66. The inner ends of the inner dogs 76 are provided with inwardly-extending arcuate projections 80 (FIGURE 3) which engage a peripheral groove 82 in the locating sleeve 44. The depths of the grooves 74 are at least equal to the thicknesses of the inner dogs 76 so that the outer surfaces of the latter lie at least flush with or slightly below the precisely-machined flat radial surface 84. The surface 84 serves as an abutment surface slidably receiving the precisely-machined flat radial end surface 86 of a flanged measurement transfer sleeve 88. The measurement transfer sleeve 88 at its inner end has a precisely-machined cylindrical surface 90 terminating at its outer flanged end in a radial shoulder 92. The inner end portion 94 of the sleeve 88 is tapered slightly for easy entry into the bore 42 in the resilient annular member 36 of the oil seal 32 and the cylindrical surface 90 is of substantially the same diameter as the bore 42 in order to fit the latter snugly. The taper of the surface 94, for example, in one embodiment of the instrument 10 was only four one-thousandths of an inch (0.004") over a length of three-eights of an inch, the extreme inner end of the sleeve 88 being chamfered (FIGURE 1).

The outer end 86 of the flanged sleeve 88 is held against the machined radial surface 84 of the handle ring 66 by four radial outer dogs 96 (FIGURES 2 and 5) which are seated in shallow radial grooves 98 in the surface 84 of the handle ring 66. The outer dogs 96 are drilled for the reception of Allen screws 100 threaded into the handle ring 84 for the purpose of holding the outer dogs 96 in fixed positions. The inner ends of the outer dogs 96 are provided with radially-extending stepped arcuate projections 102 which overlie the radial annular shoulder 92 on the measurement transfer sleeve 88 in a snug manner which, nevertheless, permits limited radial sliding of the sleeve 88 relatively to the handle ring 66 without wobble or appreciable lost motion. In order to prevent relative rotation between the locating sleeve 44 and the measurement transfer sleeve 88, the former is drilled radially at 104 to receive a radial pin 106 firmly seated therein with its inner end snugly but slidably engaging a radial hole 108 in the locating sleeve 44.

Near its periphery, the handle ring 66 is provided with a bore 110 disposed parallel to the axis of the bore 46 in the locating sleeve 44 (FIGURE 1) for the reception of the tubular stem 112 of a dial indicator measuring unit, generally designated 114. The stem 112 is held against rotation relatively to the handle ring 66 by set screws 116 threaded through the latter into the bore 110 and engaging inclined flats 118 on the stem 112. The inner end portion of the stem 112 is provided with a diametral bore 120 (FIGURE 1) which crosses the end of an axial bore 122 extending through the center of the stem 112. Snugly but reciprocably mounted in the diametral bore 120 is a measuring pin or feeler element 124, the inner end 126 of which engages the outer cylindrical surface 90 of the measurement transfer sleeve 88. The measuring pin 124 intermediate its opposite ends and within the confines of the diametral bore 120 is provided with a precisely-machined recess 128, one of the flat sides 130 of which engages a knife edge 132 on a diametral end projection 134 of a motion-transmitting rod 136 rotatably mounted in the stem bore 122. The opposite end of the motion-transmitting rod 136 is provided with a similar diametral end projection 138 having a knife edge 140 thereon.

The outer end of the hollow stem 112 is seated in a counterbore 142 in a gauge handle or palm grip 144. The counterbore 142 terminates at its inner end in a smaller diameter bore 146 into which the diametral sharp-edged projection 138 of the motion-transmitting rod 136 projects. The palm grip 144 as its name suggests, is shaped to fit the operator's palm and fingers for firm grasping, and possesses a transverse counterbore 148 with its axis disposed perpendicular to the axis of the counterbore 142 and bore 146 and communicating with the latter through a reduced diameter bore 150 (FIGURE 1). The hand grip 114 is provided with a T-slot 152 providing an axially-split portion 154, the two halves of which are drilled and threaded to be drawn toward one another by a clamping screw 156 to tightly clamp the hollow stem 158 of a conventional dial indicator 160 in the counterbore 148.

The dial indicator 160 is of a type well known to those skilled in the machine and measurement arts and is commercially available on the open market in several different forms. The dial indicator head 162 is watch-shaped and is provided with a graduated dial (not shown) with which registers a needle or pointer (also not shown) rotated by motion-multiplying mechanism within the head 162 actuated by a plunger 164 with an enlarged head 166 (FIGURE 1). The head 166 is reciprocably mounted within a bore 168 in the dial indicator stem 158 and is urged inwardly by a compression spring 170 relatively to the bore 150 so that its flat precisely-machined inner end 172 engages the knife edge 140 on the diametral projection 138 of the motion-transmitting rod 136.

In the operation of the shaft-and-bore concentricity gauge 10 of FIGURES 1 to 5 inclusive, let it be assumed that the operator has carefully pushed the tapered end portion 94 of the flanged measurement transfer sleeve 88 into the bore 42 in the annular member 36 of the oil seal 32, the concentricity of which is to be measured, at the same time permitting the sleeve 88 to slide radially relatively to the handle ring 66 while being held in retention therewith by the four outer dogs 96. Let it also be assumed that the locating sleeve 44 meanwhile has been slid over the end portion 14 of the shaft 16 with the end surface 52 of the cupped stop member 50, coming to rest snugly and firmly against the end surface 12 of the shaft 16 and with the keyway 48 receiving the exposed portion of the Woodruff key 22.

Holding the knurled handle disc 58 stationary in one hand, the operator grasps the handle ring 66 or dial indicator hand grip 144 in the other hand and rotates the one or the other in such a manner as to cause the stem 112 to move in a circular path around the axis of the shaft 16, causing the inner end 126 of the measuring pin or feeler 124 to trace out a circular path on the cylindrical surface 90 of the measurement transfer sleeve 88. If the external surface 90, which by transfer represents the internal surface 42, is not accurately coaxial with the shaft 16, the measuring pin or feeler 124 will move radially inward or outward, causing the motion-transmitting rod 136 to rotate and consequently move the dial indicator plunger 166 radially so as to indicate the lack of concentricity by the swinging of the dial indicator needle relatively to its graduated dial within the dial indicator head 162. The greater the lack of concentricity, the greater is the motion of the needle, whereas if the internal surface 42 is accurately concentric with the axis of the shaft 16, no motion of the needle occurs because no motion of the feeler or measuring pin 124 occurs.

Figure 6:
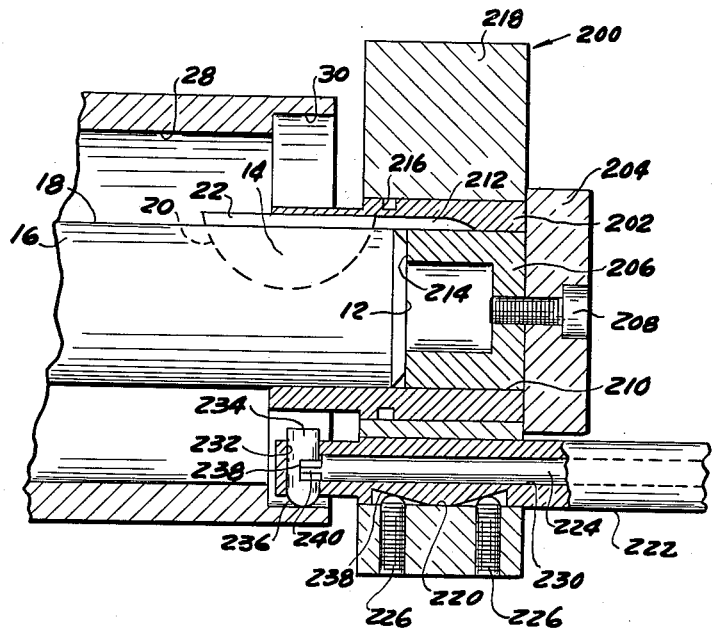
FIGURE 6 is a fragmentary central longitudinal vertical section through a modified shaft-and-bore concentricity gauge adapted for direct concentricity measurement of a bore relatively to a shaft.

The modified shaft-and-bore concentricity gauge, generally designated 200, shown in FIGURE 6 is of similar construction in most respects to the concentricity gauge 10 of FIGURES 1 to 5 inclusive, from which it differs by directly measuring the concentricity of the annular counterbore 30 relatively to the shaft 16, where there is an annular radial space between them sufficiently wide to accommodate the extremely short measuring pin or feeler of the gauge 200, as described more in detail below. As before, the gauge 200 is provided with a forwardly projecting locating sleeve 202 to which is bolted or otherwise secured a knurled handle disc 204 which in turn has a cup-shaped stop member 206 secured thereto by the screw 208. The locating sleeve 202 has a shaft-receiving locating bore 210 snugly fitting the shaft outer surface 18 and a keyway 212 receiving the projecting portion of the Woodruff key 22 mounted in the key seat 20. The stop member 206 also has an end surface 214 which rests against the end surface 12 of the shaft 16.

The locating sleeve 202, as before, is provided with an annular groove 216 in its periphery by which the knurled handle ring 218 is held in assembly therewith by means of radial dogs (not shown) similar to the radial dogs 76 of FIGURE 2 and similarly mounted in radial grooves.

As before, the handle ring 218 is provided with a de-centered bore 220 disposed parallel to the axis of the locating sleeve bore 210 and receiving the hollow stem 222 containing the rotary motion-transmitting rod 224 and held against rotation by the set screws 226 engaging the inclined flats 228 on the stem 222. The longitudinal stem bore 230 extends forwardly into the transverse measuring pin bore 232, located as before, at the forward end of the stem 222. The transverse bore 232 contains a short measuring pin or feeler extending radially outward from said locating bore 210 and having a rounded outer end 236 engageable with the counterbore 30 to be measured for concentricity with the shaft 16. The measuring pin or feeler 234 is notched as at 238 to engage the sharp-edged end projection 240 for transforming rectilinear motion of the pin 234 into rotary motion of the rod 224, as described above in connection with the concentricity gauge 10. The rotary motion of the motion-transmitting rod 224 is also transformed into reciprocating motion of the dial indicator plunger 164 of the dial indicator 160 (FIGURE 1) located as before, at the rearward end of the stem 222 and thence into swinging motion of the needle thereof in the same manner as described in connection with the dial indicator 160 of FIGURE 1.

In the operation of the modified shaft-and-bore concentricity gauge 200 of FIGURE 6, the operator grasps the handle ring 218 in one hand and the dial indicator hand grip 114 (FIGURE 1) in the other, rotating the instrument 200 until the keyway 212 is aligned with the projecting portion of the Woodruff key 22, whereupon he pushes the instrument over the end portion 14 of the shaft 16 while the Woodruff key 22 enters the keyway 212 and the forward end of the stem 222 enters the counterbore 30 in such a manner that the rounded end 236 of the measuring pin or feeler 234 engages the counterbore 30.

As before, while holding stationary with one hand the knurled handle disc 204 and with it the sleeve 202 and shaft 16 keyed thereto, the operator then rotates the knurled handle ring 218 with his other hand, thereby causing the tip 236 of the measuring pin or feeler 234 to trace out a circular path around the counterbore 30. If the counterbore 30 is accurately concentric with the shaft 16, the measuring pin or feeler 234 remains stationary in a radial direction, hence no motion is transmitted to the motion-transmitting rod 224 and the needle of the dial indicator 160 (FIGURE 1) remains stationary relatively to its graduated dial. If, on the other hand, eccentricity exists between the counterbore 30 and the shaft 16, the measuring pin or feeler 234 will move radially in its transverse bore 232 (FIGURE 6), causing this motion to be transmitted in the above-described manner to the dial indicator plunger 164 and its amount consequently indicated by the motion of the needle (not shown) of the dial indicator 160 relatively to its graduated dial.

What I claim is:

1. A shaft-and-bore concentricity gauge for measuring the concentricity of a shaft and a radially-spaced surrounding bore by means of a dial indicator, said gauge comprising a gauge-carrying structure having a shaft-receiving locating bore therein, a hollow dial indicator support mounted on said structure with its forward end projecting forwardly therefrom, a concentricity measuring feeler member reciprocably mounted for tansverse motion in the forward end of said support, a dial indicator mounted on the rearward portion of said support, motion-converting mechanism in said dial indicator support operatively connecting said feeler member to said dial indicator, a tubular measurement transfer member mounted on said gauge-carrying structure for sliding motion relatively thereto in a direction perpendicular to the axis of said locating bore, said measurement transfer member encircling said locating bore and having an external cylindrical surface adapted to fit snugly but removably into said surrounding bore while moving radially in response to any eccentricity of said surrounding bore relatively to said locating bore, said feeler member operatively engaging said external cylindrical surface of said measurement transfer member and responsive to radial motion of said measurement transfer member for effecting indication thereof upon said dial indicator.

2. A shaft-and-bore concentricity gauge, according to claim 1, wherein said feeler member is spaced axially away from the place of engagement of said measurement transfer member with said surrounding bore.

3. A shaft-and-bore concentricity gauge, according to claim 1, wherein said dial indicator support is disposed with its longitudinal axis substantially parallel to the axis of said locating bore in radially-spaced relationshp therewith.

4. A shaft-and-bore concentricity gauge, according to claim 1, wherein said gauge-carrying structure has a radially-directed end face thereon disposed substantially perpendicular to the axis of said locating bore and wherein said measurement transfer member has a radially-directed end face slidably engaging said structure end face.

5. A shaft-and-bore concentricity gauge, according to claim 1, wherein means is mounted on said structure in retaining engagement with said measurement transfer member while permitting radial sliding motion thereof relatively to said structure.

6. A shaft-and-bore concentricity gauge, according to claim 4, wherein retaining means is mounted on said structure end face in retaining engagement with said measurement transfer member while permitting radial sliding motion thereof relatively to said structure.

7. A shaft-and-bore concentricity gauge, according to claim 6, wherein said measurement transfer member has a flange thereon adjacent said transfer member end face and wherein said retaining means retainingly engages said flange.

8. A shaft-and-bore concentricity gauge, according to claim 1, wherein means is provided in said structure adjacent said locating bore for preventing relative rotation between said locating bore and the shaft inserted therein.

9. A shaft-and-bore concentricity gauge, according to claim 8, wherein said structure has a central portion containing said locating bore and a peripheral portion carrying said dial indicator support, said peripheral portion being mounted on said central portion for rotation relatively thereto.

10. A shaft-and-bore concentricity gauge, according to claim 9, wherein coupling means is provided connecting said measurement transfer member to said peripheral portion of said structure for permitting relative radial sliding motion thereof while preventing relative rotation therebetween.

11. A shaft-and-bore concentricity gauge for measuring the concentricity of a shaft and a radially-spaced surrounding bore within the annular space therebetween by means of a dial indicator, said gauge comprising a gauge-carrying structure having a shaft-receiving locating bore therein, a hollow dial indicator support mounted on said structure with its longitudinal axis disposed substantially parallel to the axis of said locating bore and with its forward end projecting forwardly therefrom into the annular space between the shaft and the surrounding bore, a concentricity measuring feeler member reciprocably mounted in the forward end of said support for motion transversely to the longitudinal axis thereof, a dial indicator mounted on the rearward portion of said support, and motion-converting mechanism in said dial indicator support operatively connecting said feeler member to said dial indicator, said structure having a forwardly-projecting portion containing said locating bore, and said feeler member extending radially outward from said locating bore of said forwardly-projecting portion and having an outer contact end adapted to engage said surrounding bore.

12. A shaft-and-bore concentricity gauge, according to claim 11, wherein means is provided in said forwardly-projecting structure portion for preventing relative rotation between said locating bore and the shaft inserted therein.

References Cited in the file of this patent

UNITED STATES PATENTS

| | | |
|---|---|---|
| 2,146,508 | McClure | Feb. 7, 1938 |
| 2,700,224 | Johnson | Jan. 25, 1955 |
| 2,812,588 | Verrant | Nov. 12, 1957 |
| 2,938,272 | Conklin | May 31, 1960 |